(12) United States Patent
Boss et al.

(10) Patent No.: US 11,034,361 B2
(45) Date of Patent: Jun. 15, 2021

(54) ROUTE DETERMINATION FOR SWITCHING BETWEEN AUTONOMOUS AND MANUAL DRIVING MODES

(71) Applicant: INTERNATIONAL BUSINESS MACHINES CORPORATION, Armonk, NY (US)

(72) Inventors: Gregory J. Boss, Saginaw, MI (US); Jeremy R. Fox, Georgetown, TX (US); Christian Compton, Austin, TX (US); John E. Moore, Jr., Pflugerville, TX (US); Andrew R. Jones, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 94 days.

(21) Appl. No.: 16/202,298

(22) Filed: Nov. 28, 2018

(65) Prior Publication Data

US 2020/0164895 A1 May 28, 2020

(51) Int. Cl.
*B60W 50/08* (2020.01)
*G06F 16/9537* (2019.01)
(Continued)

(52) U.S. Cl.
CPC .......... *B60W 50/082* (2013.01); *B60W 50/14* (2013.01); *G05D 1/0088* (2013.01);
(Continued)

(58) Field of Classification Search
CPC ............... B60W 50/082; B60W 50/14; B60W 2555/20; B60W 2552/00; B60W 2554/00;
(Continued)

(56) References Cited

U.S. PATENT DOCUMENTS 9,566,986 B1 2/2017 Gordon
2013/0297140 A1* 11/2013 Montemerlo ........... B60T 8/885
701/25
(Continued)

FOREIGN PATENT DOCUMENTS

WO 2017218563 A1 12/2017

OTHER PUBLICATIONS

International Transport Forum, "Automated and Autonomous Driving Regulation under uncertainty," https://cyberlaw.stanford.edu/files/publication/files/15CPB_AutonomousDriving.pdf, Accessed Nov. 18, 2018, 32 pages.
Turpen, "Switch from autonomous driving to manual control opens window of risk," https://newatlas.com/stanford-autonomous-driving-manual-transition-danger/46832/, Dec. 7, 2016, 3 pages.
(Continued)

*Primary Examiner* — Thomas Ingram
(74) *Attorney, Agent, or Firm* — Brian Restauro; Andrew D. Wright; Roberts Calderon Safran & Cole, P.C.

(57) ABSTRACT

A method includes: determining, by a computer device, conditions along a predefined driving route of a vehicle; determining, by the computer device and based on the conditions, risk factors of segments of the driving route; determining, by the computer device, an optimal one of the segments for switching the vehicle from autonomous driving mode to manual driving mode; and outputting, by the computer device, data defining the determined optimal one of the segments.

17 Claims, 5 Drawing Sheets

(51) Int. Cl.
  *G05D 1/00* (2006.01)
  *B60W 50/14* (2020.01)
(52) U.S. Cl.
  CPC ............... *G06F 16/9537* (2019.01); *B60W 2050/143* (2013.01); *B60W 2540/043* (2020.02); *B60W 2552/00* (2020.02); *B60W 2554/00* (2020.02); *B60W 2555/20* (2020.02); *B60W 2900/00* (2013.01); *G05D 2201/0213* (2013.01)
(58) Field of Classification Search
  CPC ....... B60W 2540/043; B60W 2900/00; B60W 2050/143; G05D 1/0088; G05D 2201/0213; G06F 16/9537
  See application file for complete search history.

(56) References Cited

U.S. PATENT DOCUMENTS

| | | | |
|---|---|---|---|
| 2017/0080948 A1 | 3/2017 | Lubbers | |
| 2018/0003518 A1* | 1/2018 | Hoareau | G01C 21/3484 |
| 2018/0148071 A1* | 5/2018 | Kim | G05D 1/0088 |
| 2018/0186376 A1* | 7/2018 | Lee | B60W 50/10 |
| 2019/0186947 A1* | 6/2019 | Rockmore | B60K 35/00 |

OTHER PUBLICATIONS

Merat, "Transition to manual: Driver behaviour when resuming control from a highly automated vehicle," Transportation Research Part F: Traffic Psychology and Behaviour vol. 27, Part B, Nov. 2014, pp. 274-282.

\* cited by examiner

ROUTE DETERMINATION FOR SWITCHING BETWEEN AUTONOMOUS AND MANUAL DRIVING MODES

BACKGROUND

The present invention relates generally to autonomous vehicles and, more particularly, to determining optimal portions of a driving route for switching an autonomous vehicle between an autonomous driving mode and a manual driving mode.

Autonomous vehicles are growing in popularity and will become the majority of vehicles on the road at some point in the future. Currently, we live in an automotive population of cars that is mixed with fully autonomous, semi-autonomous, and fully manually driven vehicles.

SUMMARY

In a first aspect of the invention, there is a computer-implemented method including: determining, by a computer device, conditions along a predefined driving route of a vehicle; determining, by the computer device and based on the conditions, risk factors of segments of the driving route; determining, by the computer device, an optimal one of the segments for switching the vehicle from autonomous driving mode to manual driving mode; and outputting, by the computer device, data defining the determined optimal one of the segments.

In another aspect of the invention, there is a computer program product including a computer readable storage medium having program instructions embodied therewith. The program instructions are executable by a computer device to cause the computer device to: determine conditions along a predefined driving route of a vehicle; determine, based on the conditions, risk factors of segments of the driving route; determine each of the segments as being optimal or non-optimal for switching the vehicle from autonomous driving mode to manual driving mode; and generate data that causes a user interface of the vehicle to display a map that shows: each of the segments along the driving route; and an indicator of each of the segments as being optimal or non-optimal.

In another aspect of the invention, there is system including a processor, a computer readable memory, and a computer readable storage medium. The system includes: program instructions to determine conditions along a predefined driving route of a vehicle; program instructions to determine, based on the conditions, risk factors of segments of the driving route; program instructions to determine each of the segments as being optimal or non-optimal for switching the vehicle from autonomous driving mode to manual driving mode; and program instructions to generate data that causes a user interface of the vehicle to display a map that shows: each of the segments along the driving route; and an indicator of each of the segments as being optimal or non-optimal. The program instructions are stored on the computer readable storage medium for execution by the processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to autonomous vehicles and, more particularly, to determining optimal portions of a driving route for switching an autonomous vehicle between an autonomous driving mode and a manual driving mode. According to aspects of the invention, a system and method monitor applicable tasks and risks during driving to determine the best (e.g., optimal) and worst times for a driver to drive their vehicle (e.g., in manual driving mode) versus being a non-acting passenger in an autonomous vehicle (e.g., in autonomous driving mode). Implementations of the invention dynamically determine the optimal time and minimal risk for a driver to assume driving of a vehicle in order to maintain the safest experience possible. Embodiments accomplish this by determining a safest period along a selected route for manual driving, which allows for the optimal alternative to be selected.

As autonomous vehicles become more popular, it is conceivable that driving will become something that is performed more for pleasure than just for transportation. Certain people may opt to never drive at all, while others would still like to drive but want to responsibly minimize the risk they assume while driving for pleasure. Things that might prevent the person from driving include weather events, heavy traffic, bad road conditions, and surrounding risk factors. It is therefore useful to plan and develop methods that will continue to aid our population as we move towards a higher part of the population riding in autonomous vehicles. Aspects of the invention focus on the scenario where the driver wants to ride in an autonomous vehicle most of the time, but still would like the ability to safely assume driving in manual mode while minimizing risk.

Accordingly, aspects of the invention include a system and method that: gather and analyze external factors (e.g., weather, road conditions, other drivers, etc.) along a predefined route; analyze the driver's behaviors and capabilities (e.g. speeding tickets, propensity to drive slowly, not use turn signals, etc.); determine a risk factor for each segment of the route (based upon the obtained data and analysis); identify the safest segments for manual driving mode; and take the vehicle out of manual mode and restart autonomous mode automatically.

Based on this and the description that follows, it will be understood that implementations of provide a computer-implemented method comprising: receiving one or more inputs for a predefined route, wherein the one or more inputs comprise weather information and road conditions along the predefined route; determining a risk factor for an autonomous driving mode during one or more portions of the predefined route based, at least in part, on weather information and road conditions along the predefined road; modifying the risk factor for an autonomous driving mode during one or more portions of the predefined route based on driver behavior and capability; identifying one or more portions of the predefined route as being optimal portions of the predefined route for the autonomous driving mode; and switching a manual driving mode to the autonomous driving mode at the optimal portions of the predefined route.

In embodiments, the method further comprises switching the autonomous driving mode to a manual driving mode based, at least in part, on driver behavior and capability. In embodiments, the method further comprises generating a map that can be displayed on a smart screen display of a vehicle navigating the predefined route that shows the identified one or more portions of the predefined route as being optimal portions of the predefined route. In embodiments, the driver behavior comprises information regarding a historical record of the driver that includes: speeding tickets a driver received; the driver's preference to drive at certain speeds; the driver's preference to use or not use turn signals; and documented instances the driver displayed an adverse reaction to a road maneuver taken by a different driver. In embodiments, optimal portions of the predefined route for the autonomous driving mode are identified as one or more of: segments of road along the predefined route; a length of time traveled on the one or more segments of the road; a distance traveled along one or more segments of the road; and a time at which the driver will drive along the one or more segments of the road.

Embodiments of the invention improve the technology of autonomous vehicles by providing users with automated tools that automatically determine optimal portions of a route for switching an autonomous vehicle between an autonomous driving mode and a manual driving mode. Embodiments of the invention employ an unconventional arrangement of steps including: determining, by a computer device, conditions along a predefined driving route of a vehicle; determining, by the computer device and based on the conditions, risk factors of segments of the driving route; determining, by the computer device, an optimal one of the segments for switching the vehicle from autonomous driving mode to manual driving mode; and outputting, by the computer device, data defining the determined optimal one of the segments. The steps themselves are unconventional, and the combination of the steps is also unconventional. For example, the steps of determining, based on the conditions, risk factors of segments of the driving route, and determining an optimal one of the segments for switching the vehicle from autonomous driving mode to manual driving mode create new information that does not exist in the system, and this new information is then used in subsequent steps in an unconventional manner.

To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
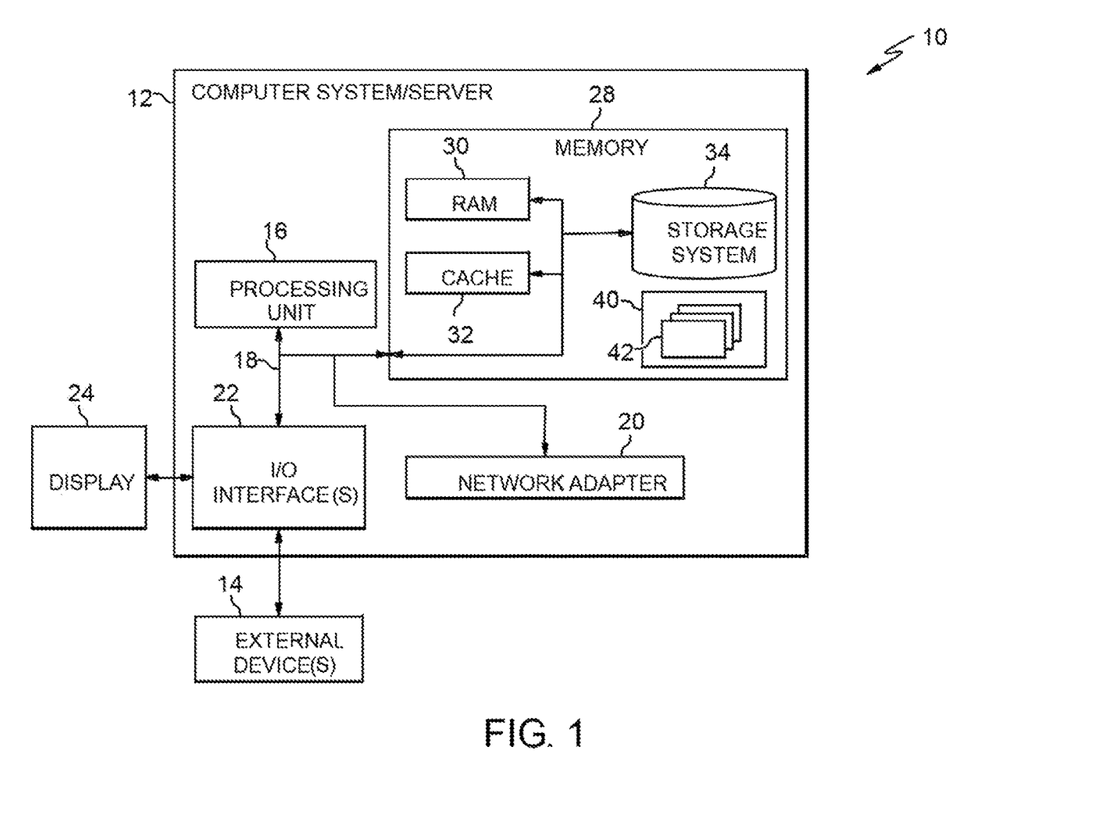
FIG. 1 depicts a computer infrastructure according to an embodiment of the present invention.

Referring now to FIG. 1, a schematic of an example of a computer infrastructure is shown. Computer infrastructure 10 is only one example of a suitable computer infrastructure and is not intended to suggest any limitation as to the scope of use or functionality of embodiments of the invention described herein. Regardless, computer infrastructure 10 is capable of being implemented and/or performing any of the functionality set forth hereinabove.

In computer infrastructure 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computer infrastructure 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2A:
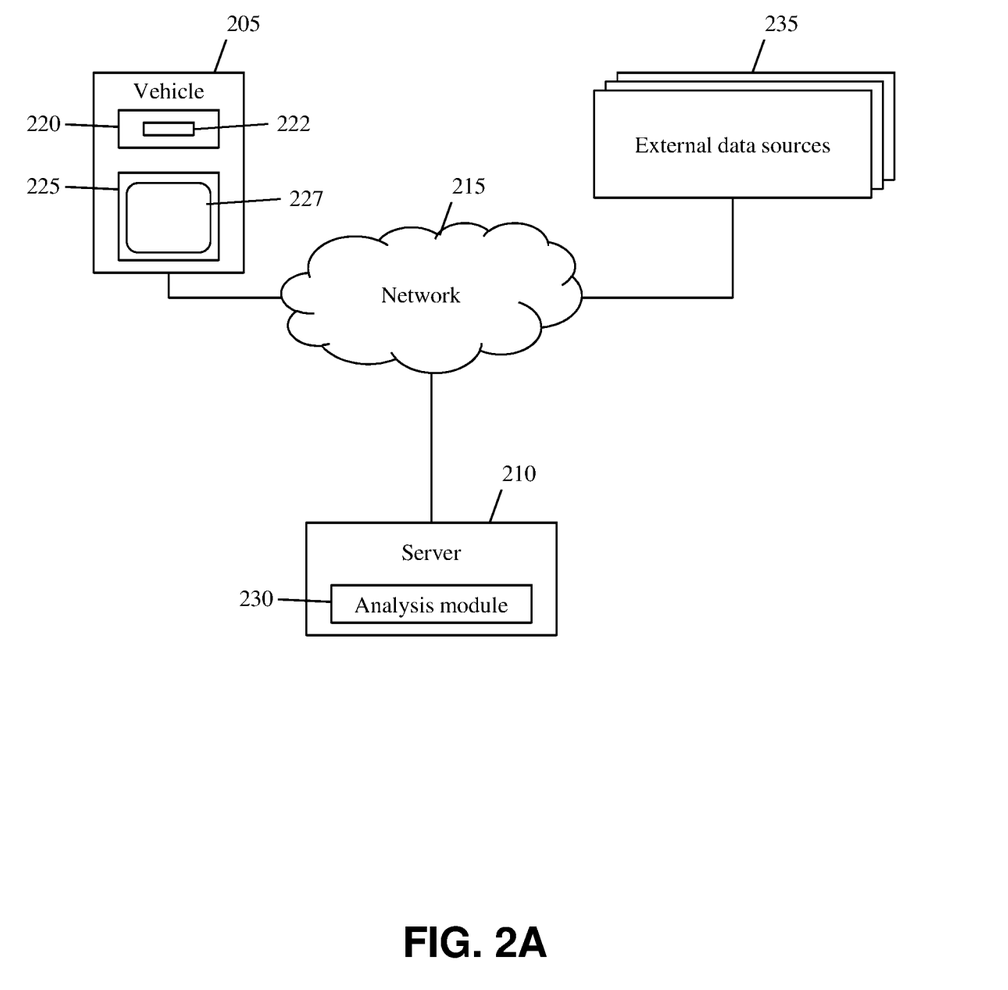
FIG. 2A shows a block diagram of an exemplary environment in accordance with aspects of the invention.

FIG. 2A shows a block diagram of an exemplary environment in accordance with aspects of the invention. In embodiments, the environment includes a vehicle 205, a server 210, and a network 215. According to aspects of the invention, the vehicle 205 is a motor vehicle (e.g., car, truck, etc.) that is capable of being operated in (and selectively switched between) an autonomous driving mode and a manual driving mode. In the autonomous driving mode, a computer 220 of the vehicle 205 controls the driving movement of the vehicle 205. In the manual driving mode, a user (e.g., a human driver) controls the driving movement of the vehicle 205.

In embodiments, the computer 220 is an onboard computer and comprises one or more elements of the computer system 12 of FIG. 1. The computer 220 is configured to communicate with the server 210 via the network 215. The network 215 comprises a communication network such as a LAN, WAN, or the Internet, or a combination of such communication networks. At least a portion of the communication between the computer 220 and the server 210 comprises wireless communication.

The vehicle 205 also includes a display 225. In embodiments, the computer 220 comprises a navigation module 222 that causes the display 225 to display a user interface (UI) 227 that provides vehicle navigation functionality to the driver of the vehicle 205. In embodiments, the display 225 comprises a touch-screen display by which a user may provide input to the computer 220 by physically touching a surface of the display 225. In implementations, the navigation functionality provided by the navigation module 222 and the UI 227 includes, but is not limited to, displaying a road map, showing a current location of the vehicle 205 on the road map, displaying a driving route on the road map, and making real time updates to the displayed map and driving route based on the determined location of the vehicle 205. The navigation module 222 determines the current location of the vehicle 205 using location system data, such as global positioning system (GPS) data. The navigation module 222 determines the current speed of the vehicle 205 from sensor data of the vehicle 205. The navigation module 222 determines the driving route based on input provided by the user (e.g., driver) of the vehicle 205 and using route determining programming.

According to aspects of the invention, the server 210 includes an analysis module 230 that is configured to determine optimal portions of a driving route for switching the vehicle 205 between autonomous driving mode and manual driving mode. In embodiments, the analysis module 230 is configured to: analyze external conditions such as weather, construction, and traffic along a route defined in the navigation system of the vehicle 205; analyze characteristics of other drivers along the route; determine a respective risk factor for different segments of the route; determine a safest segment along the route for the driver of the vehicle 205 to switch to manual driving mode; switch the vehicle 205 to manual driving mode at the start of the determined safest segment; and switch the vehicle 205 to autonomous driving mode at the end of the determined safest segment or when the risk factor for the safest segment changes state.

In embodiments, the analysis module 230 comprises one or more program modules such as program modules 42 described with respect to FIG. 1. The server 210 may include additional or fewer modules than those shown in FIG. 2A. In embodiments, separate modules may be integrated into a single module. Additionally, or alternatively, a single module may be implemented as multiple modules. Moreover, the quantity of devices and/or networks in the environment is not limited to what is shown in FIG. 2A. In practice, the environment may include additional devices and/or networks; fewer devices and/or networks; different devices and/or networks; or differently arranged devices and/or networks than illustrated in FIG. 2A.

According to aspects of the invention, the analysis module 230 performs the analysis and determination functions described herein based on data obtained from the vehicle 205 and from external data sources 235. In embodiments, the data obtained from the vehicle 205 includes: current location of the vehicle 205; current speed of the vehicle 205; driving route defined the navigation module 222 of the vehicle 205; and driver information associated with the current diver of the vehicle 205. In embodiments, the data obtained from the external data sources 235 includes: weather data; traffic data; and road construction data. In embodiments, the data obtained from the external data sources 235 also includes: driving route data of other vehicles (e.g., other than vehicle 205) and driver information associated with the drivers of the other vehicles. The external data sources 235 may comprise one or more computer systems of one or more third parties that provide such data, e.g., in accordance with agreement(s) with an enterprise that provides the services of the analysis module 230.

Figure 2B:
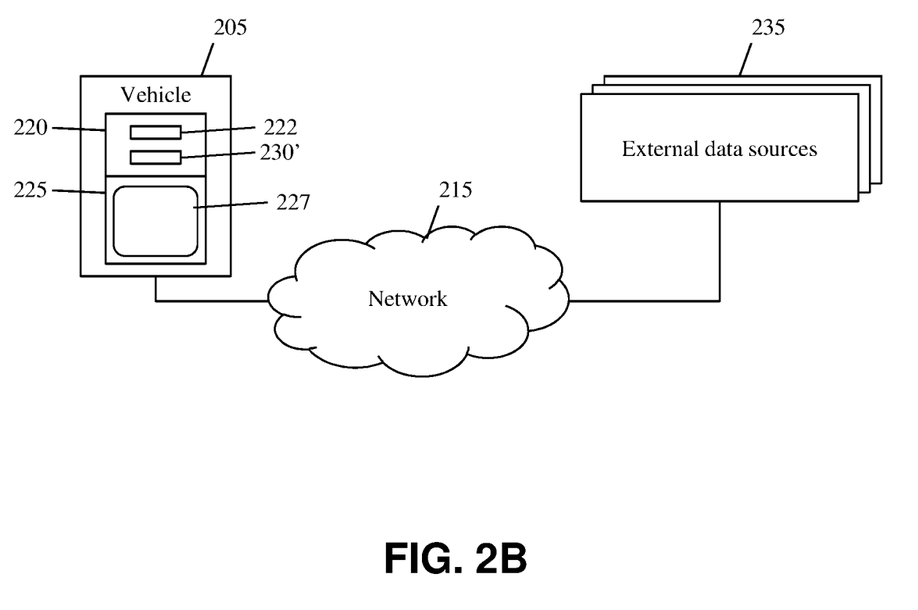
FIG. 2B shows a block diagram of an exemplary environment in accordance with aspects of the invention.

FIG. 2B shows a block diagram of an exemplary environment in accordance with aspects of the invention. In the embodiment shown in FIG. 2B, the analysis module 230' is stored and executed by the computer 220 of the vehicle 205. In this manner, the functions performed by the analysis module 230' are performed onboard the vehicle 205, as opposed to by the server 210 as in the embodiment of FIG. 2A.

Figure 3:
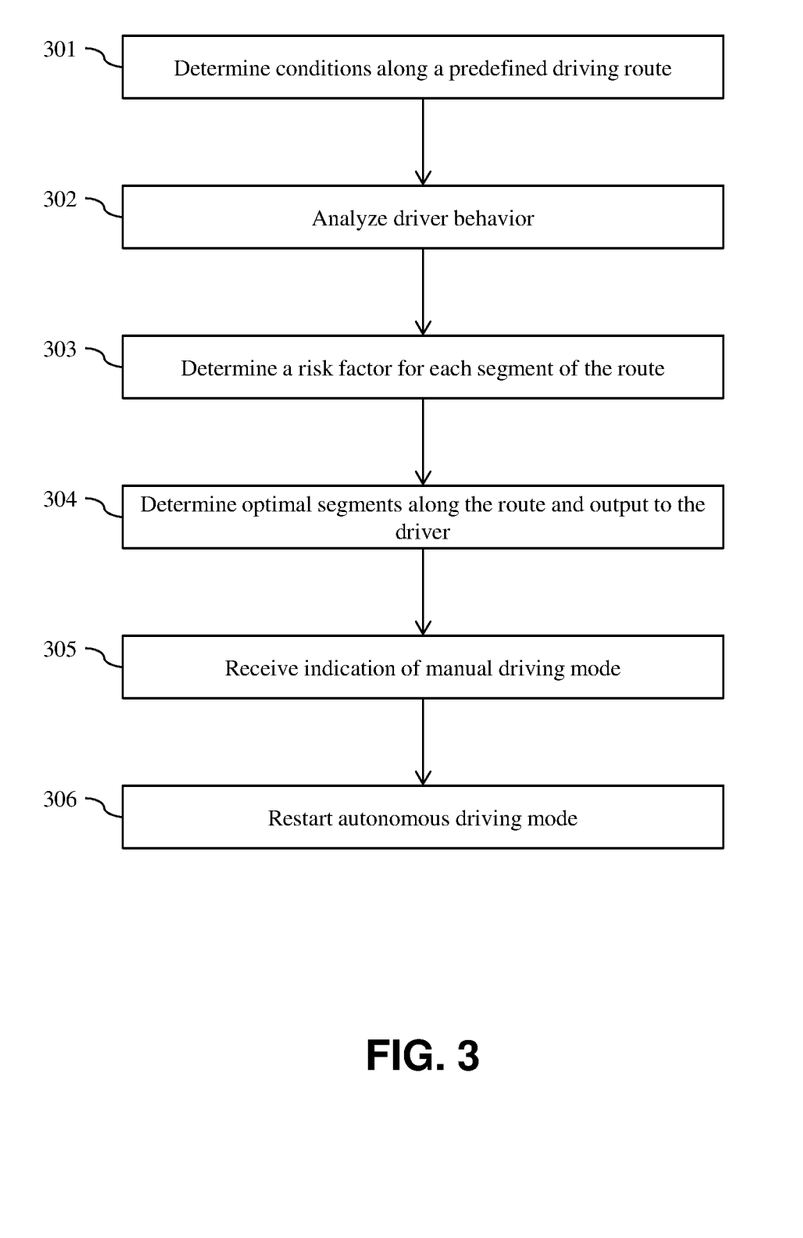
FIG. 3 shows a flowchart of an exemplary method in accordance with aspects of the invention.

FIG. 3 shows a flowchart of an exemplary method in accordance with aspects of the present invention. Steps of the method may be carried out in the environment of FIG.

2A or 2B and are described with reference to elements depicted in FIGS. 2A and 2B.

At step 301, the system determines conditions along a predefined driving route. In embodiments, step 301 comprises the analysis module 230/230' obtaining data from the vehicle 205 and the external data sources 235. In embodiments, and as described with respect to FIG. 2A, the data obtained from the vehicle 205 includes: current location of the vehicle 205; current speed of the vehicle 205; driving route defined the navigation module 222 of the vehicle 205; and driver information associated with the current diver of the vehicle 205. In embodiments, and as described with respect to FIG. 2A, the data obtained from the external data sources 235 includes information about conditions along a predefined driving route such as: weather along the driving route; traffic along the driving route; and road construction along the driving route. In this manner, the analysis module 230/230' determines a baseline of locations along the driving route of the vehicle 205 that are affected by conditions including at least one of weather, traffic, and construction. In embodiments, the analysis module 230/230' continuously updates these determinations, e.g., whenever new data is obtained from the external data sources 235.

In embodiments, step 301 further comprises the analysis module 230/230' obtaining driving route information of other vehicles that are within a predefined distance of the driving route of the vehicle 205. In embodiments, the analysis module 230/230' uses the driving route information of the other vehicles to predict when respective ones of the other vehicles will be on the driving route of the vehicle 205. For example, by analyzing the driving route information of another vehicle and the current location of the other vehicle, and comparing this to the driving route of the vehicle 205, the analysis module 230/230' determines when and where the driving route of the other vehicle will coincide with the driving route of the vehicle 205. By doing this for all other vehicles within a predefined distance of the driving route of the vehicle 205, the analysis module 230/230' determines, for future points in time, locations along the driving route of the vehicle 205 where other vehicles will be on the road at the same time as the vehicle 205. In this manner, the analysis module determines an enhanced traffic prediction (e.g., in addition to the previously described baseline) based on predicted locations of other vehicles in the vicinity of the driving route of the vehicle 205. In embodiments, the analysis module 230/230' continuously updates these predictions, e.g., when new data is obtained for the other vehicles.

At step 302, the system analyzes driver behavior. In embodiments, step 302 comprises the analysis module 230/230' obtaining driver information about the driver of the vehicle 205. In embodiments, step 302 comprises the analysis module 230/230' obtaining driver information about the drivers of the other vehicles that are predicted to be at locations along the driving route of the vehicle 205 at the same time as the vehicle 205 (e.g., as predicted at step 301). In embodiments, the driver information obtained at step 302 is information regarding a historical record of the respective driver, the information including one or more of: speeding tickets the driver received; the driver's preference to drive at certain speeds; the driver's preference to use or not use turn signals; and documented instances the driver displayed an adverse reaction to a road maneuver taken by a different driver. In embodiments, the analysis module 230/230' obtains the driver information from third party computer devices that provide such information about drivers that have opted-in to (e.g., agreed to be a part of) the service provided by aspects of the invention.

According to aspects of the invention, the analysis module 230/230' uses the driver information to determine a risk score for each driver that is predicted to be at a location along the driving route of the vehicle 205 at the same time as the vehicle 205. The analysis module 230/230' may be programmed with any desired algorithm(s) for determining the risk score based on the driver information. In one example, the driver risk score algorithm comprises a mathematical average of a value for each identified factor (e.g., using a formulas such as: [(number of speeding tickets plus average speed over posted speed limits) mod 100] where a higher number indicates a more unsafe driver and a lower number indicates a less unsafe driver). This example is not limiting, and implementations of the invention may use other numerical techniques to calculate the risk score of a driver based on the driver information. In embodiments, risk values are assigned to each of the driver characteristics (e.g., speeding tickets the driver received; the driver's preference to drive at certain speeds; the driver's preference to use or not use turn signals; and documented instances the driver displayed an adverse reaction to a road maneuver taken by a different driver) for the driver's history and monitored characteristics. Embodiments utilize cumulative risk aggregation, which comprises combining all the risk factors of a driver together to yield an aggregated risk score. In embodiments, each driver's aggregated risk score is a defined value that can change over time as that driver exhibits relatively safer and/or relatively less safe behaviors while driving. In embodiments, step 302 comprises the analysis module determining an aggregated risk score in this manner for the driver of the vehicle 205 and for the other identified drivers (e.g., predicted to be at a location along the driving route of the vehicle 205 at the same time as the vehicle 205).

At step 303, the system determines a risk factor for segments of the driving route of the vehicle 205. In embodiments, the analysis module 230/230' determines respective risk factors for segments of the driving route of the vehicle 205 based on the baseline data (e.g., from step 301) and the other driver risk scores (e.g., from step 302).

According to aspects of the invention, step 303 comprises the analysis module 230/230' determining segments of the driving route of the vehicle 205. The analysis module 230/230' may be programmed to determine the segments in any suitable manner. Factors taken into consideration for determining the segments may include one or more of: intersections of streets, roads, highways, etc., along the driving route; types of streets, roads, highways, etc., along the driving route (e.g., two lane road versus divide highway, etc.); travel distances along the driving route; and travel times along the driving route. In some aspects, the analysis module 230/230' determines the segments of the driving route according to one or more of: portions of roads along the predefined route; a length of time traveled on the one or more segments of the road; a distance traveled along one or more segments of the road; and a time at which the driver will drive along the one or more segments of the road.

According to aspects of the invention, after determining the segments along the driving route of the vehicle 205, the analysis module 230/230' determines a risk factor for each of the determined segments. In embodiments, the analysis module 230/230' determines the risk factor for a segment using the baseline data (e.g., from step 301) and the other driver risk scores (e.g., from step 302). The analysis module 230/230' may be programmed to determine the risk factors for the segments in any suitable manner. In embodiments, the analysis module 230/230' stores score tables that define different risk scores for different conditions, and the analysis module 230/230' determines a risk factor for a defined segment by adding the risk scores for the conditions that exist at that segment. For example, the score tables may define different scores for: different types of weather (e.g., 0 for sunny, 10 for rain, 10 for fog, 20 for snow, 20 for sleet); different types of traffic (e.g., 0 for no traffic, 10 for light traffic, 15 for moderate traffic, 20 for heavy traffic); different types of construction (e.g., 0 for no construction, 20 for lane closure); and numbers of other drivers with risk scores over predefined values (e.g., 2 points for each other driver with a driver risk score greater than 50, 4 points for each other driver with a driver risk score greater than 60, 6 points for each other driver with a driver risk score greater than 70).

In embodiments, the analysis module determines the type of weather at a respective segment (using weather data from step 301 and determined segment data from step 303), the type of traffic at each determined segment (using traffic data from step 301 and determined segment data from step 303), the type of construction at each determined segment (using construction data from step 301 and determined segment data from step 303), and the number of other drivers and their associated driver risk scores at each determined segment (using driver risk score data from step 302 and determined segment data from step 303). The analysis module then determines scores for each of these determined factors from the score tables, and sums the scores for each of these determined factors for the respective segment of the driving route. The analysis module 230/230' performs this risk factor score determination for each of the determined segments of the driving route of the vehicle 205. In this manner, the analysis module 230/230' determines a numerical value for each determined segment of the driving route of the vehicle 205, where higher numerical values represent riskier segments of the driving route and lower numerical values represent less risky segments of the driving route. In embodiments, the analysis module 230/230' updates these determinations when the analysis module 230/230' obtains new data from the external data sources 235.

At step 304, the system determines optimal segments along the route and outputs the optimal segments to the driver. In embodiments, the analysis module 230/230' sorts the determined segments from highest to lowest according to their respective numerical values (risk factors determined at step 303). According to aspects of the invention, the analysis module 230/230' determines optimal segments by comparing the numerical values (risk factors for segments determined at step 303) to the driver risk factor of the driver of the vehicle 205 (determined at step 302). The analysis module 230/230' deems a segment having a numerical value (from step 303) that is less than the driver risk factor of the driver of the vehicle 205 (determined at step 302) as an optimal segment. The analysis module 230/230' deems a segment having a numerical value (from step 303) that is greater than the driver risk factor of the driver of the vehicle 205 (determined at step 302) as a non-optimal segment. In this manner, the analysis module 230/230' uses the driver risk factor of the driver of the vehicle 205 (determined at step 302) as the threshold value for determining whether a segment is an optimal segment or a non-optimal segment.

According to aspects of the invention, step 304 comprises the analysis module 230/230' communicating the determination of the optimal and non-optimal segments to the computer 220 of the navigation module 222 of the vehicle 205 for outputting this information to the driver (e.g., via the UI 227). In the embodiment shown in FIG. 2A, the analysis module 230 transmits data to the vehicle 205, wherein the data causes the computer 220 to display the optimal segments in a first visual manner in the UI 227 and to display the non-optimal segments in a second visual manner in the UI 227. In the embodiment shown in FIG. 2B, the analysis module 230' passes the data to the navigation module 222 within the computer 220, wherein the data causes the computer 220 to display the optimal segments in a first visual manner in the UI 227 and to display the non-optimal segments in a second visual manner in the UI 227. An example of displaying the optimal segments and the non-optimal segments in the UI 227 is described herein with respect to FIG. 4. In this manner, step 304 comprises generating data that causes the UI 227 to display a map that shows: each of the segments along the driving route; and an indicator of each of the segments as being optimal or non-optimal.

Still referring to FIG. 3, in the event the analysis module 230/230' determines there are no optimal segments (e.g., none of the determined segments has a numerical value of risk factor that is less than the determined risk factor of the driver of the vehicle 205), then in embodiments the analysis module 230/230' generates data that prevents the vehicle 205 from switching to manual driving mode. In embodiments, this automatic prevention of entering manual mode is an optional feature that can be enabled and disabled in the configuration settings of the computer 220 of the vehicle 205, and may be desired for providing a safety control for inexperienced drivers.

In embodiments, the system performs steps 301-304 in response to a request by the driver of the vehicle. For example, when riding in the driver seat of the vehicle 205 while the vehicle is operating in autonomous driving mode along the driving route, the user might speak, "when is the best time for me to drive 30 minutes?" In response to receiving this voice command, the navigation module 222 sends a request (e.g., an application program interface (API) call) to the analysis module 230/230' to initiate the process of determining an optimal segment based on the user's input. In response to receiving the request from the navigation module 222, the analysis module 230/230' performs steps 301-304, and returns data (to the vehicle 205) that defines determined optimal segments and determined non-optimal segments along the driving route of the vehicle 205. In response to receiving the return data from the analysis module 230/230', the navigation module 222 generates an output at the UI that visibly displays the determined optimal segments and determined non-optimal segments along the driving route of the vehicle 205.

At step 305, the system receives an indication that the vehicle 205 is in manual driving mode. In embodiments, after steps 301-304, the driver may provide input to the computer 220 (e.g., via the UI 227) to enter manual mode during one of the determined optimal segments along the driving route. The user input may comprise, for example, a spoken voice command, touch screen input at the UI 227, or placing their hands at predefined locations on the steering wheel. Upon receiving the user input, the computer 220 switches the vehicle 205 from autonomous driving mode to manual driving mode, and sends a message to the analysis module 230/230' that the vehicle 205 has switched to manual driving mode.

In embodiments, while the vehicle 205 is in manual driving mode, the analysis module 230/230' continues to update the numerical value of the risk factor for segments of the driving route as new data is obtained from the vehicle 205 and the external data sources 235. In embodiments, in the event the new data results in the current segment, on which the user is driving in manual driving mode, to change from optimal to non-optimal, the analysis module 230/230' provides data to the navigation module 222 to display an alert to the user (e.g., via the UI 227) of the change of the current segment from optimal to non-optimal. In this manner, the user may decide to provide user input to the computer 220 to cause the vehicle 205 to switch back to autonomous driving mode. In another embodiment, the data transmitted by the analysis module in this situation causes the computer 220 to automatically switch from manual driving mode to autonomous driving mode without waiting for user input. In embodiments, this automatic switching from manual driving mode to autonomous driving mode is an optional feature that can be enabled and disabled in the configuration settings of the computer 220 of the vehicle 205, and may be desired for providing a safety control for inexperienced drivers.

Figure 4:
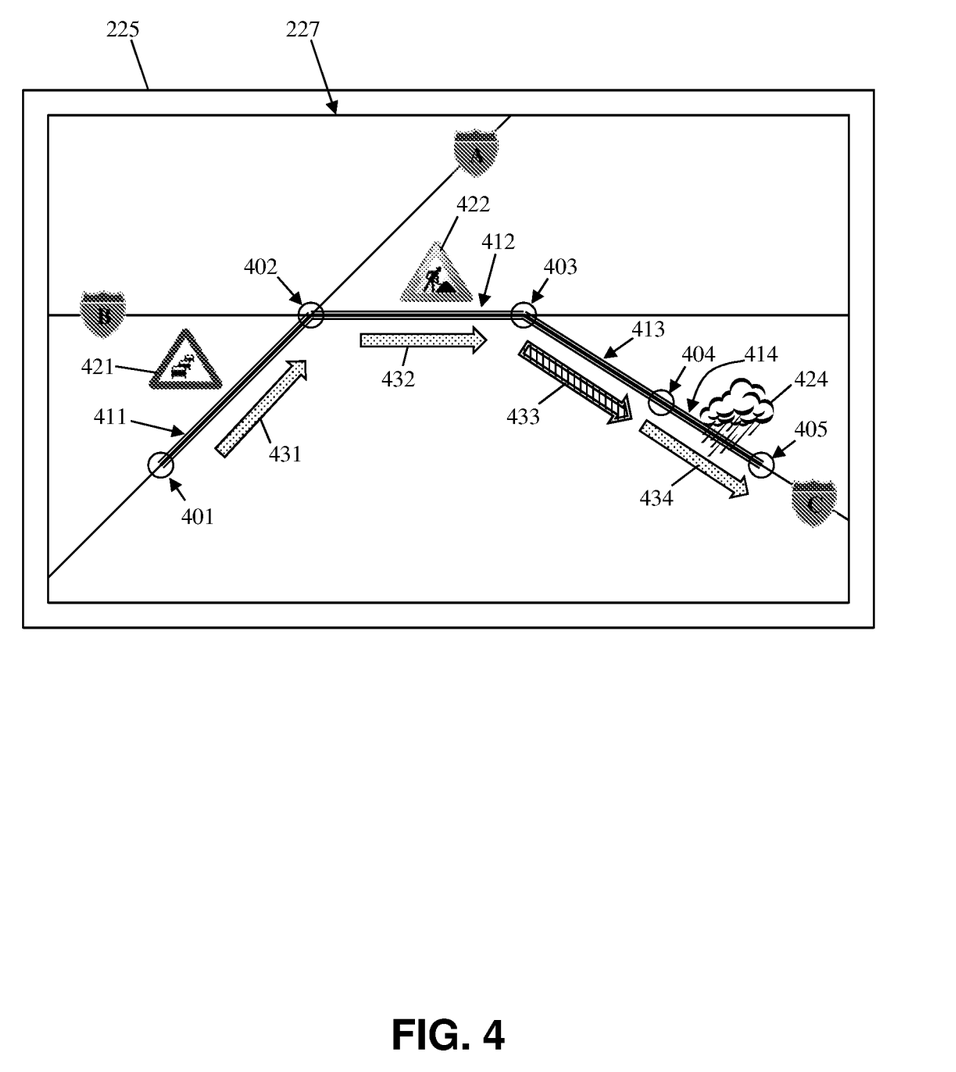
FIG. 4 shows an exemplary use case in accordance with aspects of the invention.

FIG. 4 shows an exemplary use case in accordance with aspects of the invention. In particular, FIG. 4 shows an example of the UI 227 displayed by the display 225 of the vehicle 205 in accordance with aspects of the invention. The UI 227 shows the driving route of the vehicle 205 from a starting point 401 to an end point 405, with points 402, 403, and 404 in between. Based on data determined at step 304, the UI 227 shows the determined segments 411, 412, 413, and 414 of the driving route. Based on data determined at step 301, the UI 227 shows a traffic icon 421 along the first segment 411, a construction icon 422 along the second segment 412, and a weather icon along the fourth segment 414. Based on data determined at steps 301-304, the UI 227 shows a first type of visual indicator (arrow 433) along the determined optimal segment (e.g., segment 413 in this example), and a second type of visual indicator (arrows 431, 432, 434) along the determined non-optimal segments (e.g., segments 411, 412, and 414 in this example). In this manner, the system automatically determines and provides a visual display of one or more optimal segments along the driving route for the user to assume manual driving of the vehicle 205.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   determining, by a computer device, conditions along a predefined driving route of a vehicle;
   determining, by the computer device and based on the conditions, risk factors of segments of the driving route;
   determining, by the computer device, an optimal one of the segments for switching the vehicle from autonomous driving mode to manual driving mode;
   determining a driver risk factor of a driver of the vehicle, wherein the determining the optimal one of the segments comprises comparing the risk factors of the respective segments to the driver risk factor of the driver of the vehicle; and
   outputting, by the computer device, data defining the determined optimal one of the segments.

2. The method of claim 1, wherein the conditions include at least one selected from the group consisting of: weather, traffic, and construction.

3. The method of claim 1, wherein the conditions include predicted locations of other vehicles along the driving route.

4. The method of claim 3, wherein the risk factor of a respective one of the segments is determined based on behavior of drivers of the other vehicles predicted to be on the one of the segments at the same time as the vehicle.

5. The method of claim 4, wherein the behavior is based on information regarding a historical record of the drivers of the other vehicles including at least one selected from the group consisting of: speeding tickets received; preference to drive at certain speeds; preference to use or not use turn signals; and documented instances of displaying an adverse reaction to a road maneuver.

6. The method of claim 1, further comprising determining the segments based on at least one selected from the group consisting of: segments of road along the predefined route; a length of time traveled on the one or more segments of the road; a distance traveled along one or more segments of the road; and a time at which the driver will drive along the one or more segments of the road.

7. The method of claim 1, wherein:
   the computer device is a server that communicates with the vehicle via a network; and
   the outputting the data comprises transmitting the data to the vehicle.

8. The method of claim 1, wherein:
   the computer device is in the vehicle; and
   the outputting comprises generating a map showing the segments of the driving route and the determined optimal segment.

9. The method of claim 1, further comprising:
   receiving an indication that the vehicle has switched to the manual driving mode; and
   alerting a driver of the vehicle to switch back to the autonomous driving mode based on one of: determining the vehicle is at an end of the determined optimal segment; and determining the optimal segment has changed to a non-optimal segment based on new information.

10. A computer program product, the computer program product comprising a computer readable storage medium having program instructions embodied therewith, the program instructions executable by a computer device to cause the computer device to:
- determine conditions along a predefined driving route of a vehicle;
- determine, based on the conditions, risk factors of segments of the driving route, each of the risk factors of the segments being a numerical value;
- determine each of the segments as being optimal or non-optimal for switching the vehicle from autonomous driving mode to manual driving mode;
- determine a driver risk factor of a driver of the vehicle, wherein each respective segment of the segments is determined as optimal or non-optimal based on comparing the numerical value of the risk factor of the respective segment to a numerical value of the driver risk factor of the driver of the vehicle; and
- generate data that causes a user interface of the vehicle to display a map that shows: each of the segments along the driving route; and an indicator of each of the segments as being optimal or non-optimal.

11. The computer program product of claim 10, wherein the conditions include at least one selected from the group consisting of: weather, traffic, and construction.

12. The computer program product of claim 10, wherein the conditions include predicted locations of other vehicles along the driving route.

13. The computer program product of claim 12, wherein the risk factor of a respective one of the segments is determined based on behavior of drivers of the other vehicles predicted to be on the one of the segments at the same time as the vehicle.

14. A system, comprising:
- a processor, a computer readable memory, and a computer readable storage medium;
- program instructions to determine conditions along a predefined driving route of a vehicle;
- program instructions to obtain driving route information of other vehicles that are within a predefined distance of the predefined driving route of the vehicle;
- program instructions to determine, based on the obtained driving route information of the other vehicles, predicted locations of the other vehicles along the predefined driving route of the vehicle, wherein the conditions include the predicted locations of the other vehicles along the predefined driving route of the vehicle;
- program instructions to determine, based on the conditions, risk factors of segments of the driving route;
- program instructions to determine each of the segments as being optimal or non-optimal for switching the vehicle from autonomous driving mode to manual driving mode; and
- program instructions to generate data that causes a user interface of the vehicle to display a map that shows: each of the segments along the driving route; and an indicator of each of the segments as being optimal or non-optimal,
- wherein the program instructions are stored on the computer readable storage medium for execution by the processor via the computer readable memory.

15. The system of claim 14, wherein the conditions include at least one selected from the group consisting of: weather, traffic, and construction.

16. The system of claim 14, wherein the risk factor of a respective one of the segments is determined based on behavior of drivers of the other vehicles predicted to be on the one of the segments at the same time as the vehicle.

17. The system of claim 14, wherein:
- the program instructions cause the computer device to determine a driver risk factor of a driver of the vehicle; and
- the segments are determined as optimal or non-optimal based on comparing the risk factors of the respective segments to the driver risk factor of the driver of the vehicle.

* * * * *